United States Patent [19]

Haskett

[11] Patent Number: 4,785,542

[45] Date of Patent: Nov. 22, 1988

[54] SUNDIAL

[76] Inventor: Carl E. Haskett, 17 Wilana St., Tyler, Tex. 75703

[21] Appl. No.: 64,532

[22] Filed: Jun. 22, 1987

[51] Int. Cl.[4] .............................................. G01C 12/34

[52] U.S. Cl. ...................................................... 33/270

[58] Field of Search .......................... 33/269, 270, 271

[56] References Cited

U.S. PATENT DOCUMENTS

| | | | |
|---|---|---|---|
| 303,118 | 8/1984 | Christian | 33/270 |
| 3,417,473 | 2/1968 | Troseth | 33/269 |
| 4,355,470 | 10/1982 | Doyle | 33/270 |

FOREIGN PATENT DOCUMENTS

| | | | |
|---|---|---|---|
| 915671 | 7/1946 | France | 33/270 |

*Primary Examiner*—Harry N. Haroian
*Attorney, Agent, or Firm*—John M. Harrison

[57] ABSTRACT

A sundial which is characterized by a selectively portable or permanent base, a support plate hingedly connected to the base in adjustable angular relationship for effecting latitude adjustment to the sun's path and a connecting plate pivotally attached to the support plate, with a pair of semicylindrical dials secured to the connecting plate in oppositely-disposed relationship. A pair of gnomons are suspended outwardly of the concave dial curvatures, respectively, for casting a shadow on the dials and indicating the time of day and day of the year responsive to rotation of the earth and traversal of the shadow across the dials. Each gnomon is spherical in shape and is suspended in the center of a diameter of each of the dials and the connecting plate and dials are oriented at a selected angle with respect to the base, which angle is determined by the latitude at which the sundial is positioned. Each of the dials is further provided with hour and month markings to facilitate direct reading of the time of day and the approximate day of the month on the dials responsive to the sequential casting of the shadow by the gnomons.

28 Claims, 3 Drawing Sheets

SUNDIAL

BACKGROUND OF THE INVENTION

1. Field of the Invention

This invention relates to sundials and more particularly, to a sundial which is capable of indicating both the time of day and the approximate day of the month responsive to the casting of a shadow by spherical gnomons on a pair of semi-cylindrical dials positioned at a selected angle with respect to the axis of the earth. Ideally, the sundial is fitted with a pair of dials which are angularly and pivotally-disposed with respect to the base, in order to effect traversal of the sun's shadow along multiple planes on the concave surface of the dials.

The basic problem with conventional sundials is that they do not indicate clock time. Conventional sundials use a solid gnomon which typically casts a shadow on a flat plate located on or positioned parallel to the surface of the earth. This mechanical arrangement is useless as a time indicator in the early and late portion of the day, since due to the length of the shadow cast, the shadow is barely readable in the middle of the day. Furthermore, these sundials provide no correction for the changing position of the sun relative to clock time. A correction for the position of the sun as it relates to clock time is indicated on many globes as an analemma, shown as a "FIG. 8" in the torrid zone on these globes. The analemma indicates the advance or retardation of the sun relative to clock time, as well as the latitudinal position of the sun during the changing seasons. This time dislocation results from the earth following an elliptical, rather than a circular path about the sun, with the sun positioned at a foci of the ellipse. The elliptical path of the earth may be divided into four parts; a first long path which extends from the equinox position to the farthest apogee, or the summer solstice; a second long path which extends from the farthest apogee back to the opposite equinox position; a first short path which extends from the sun to the near apogee, or the winter solstice; and a second short path from the the near apogee back to the starting equinox position. During the first long path, the earth rotates such that with each passing day, it must rotate a fractional degree greater than 360 degrees, in order to bring the same point on earth in line with the sun. Accordingly, the sun "falls behind" relative to the clock. This lag accumulates and reaches a maximum with the solstice, at which point the earth returns along the second long path. However, when the earth reaches this point in its path around the sun, the rotation of the earth is such that a fractional rotation less than 360 degrees is required to place the same point in line with the sun and the sun begins to advance with respect to local, or clock time. This phenomena is repeated in the two short paths, respectively, and the effect of this phenomenon is to create four different regimes with respect to the advance and retardation of the sun relative to our clock. Close examination of the analemma on a globe reveals that the FIG. 8 is asymmetrical in each of its four parts. Thus, the difficulty in dealing with a sundial correction for this effect has heretofore prevented the construction of a sundial which indicates the correct time regardless of the date.

Another difficulty with conventional sundials is inapplicability of these devices to any but the middle latitudes of the earth. When one considers, for example, that the sun may rise as early as 4:30 a.m. in Boston, Mass., it is understood that state-of-the-art sundials are not suited to the indication of time at such hours, nor are they designed to operate at the late settings of the sun which occur at high latitudes. It was desired to create in the current invention a sundial which will register the correct time, regardless of the season or day of the year and regardless of the latitude of the sundial position.

The sundial of this invention consists of two semi-cylinders, or dials, 180 degrees each in angular length and 47 degrees in angular width, as measured from the midpoint of the center plane or diameter of each dial. This measuring point coincides with the position of the shadow device, or point gnomon, which is itself a small sphere having a diameter sufficiently large to cast a detectable shadow. The dials are oriented such that the plane of the sun's path coincides with the plane of the center of the dials at the two equinoxes and one dial is set facing east and the companion dial facing west, with each dial capable of indicating twelve hours of the sun's passage. The longitudinal axes of the dials are ideally located so as to be parallel with the axis of the earth. Accordingly, when the sundial is located at a point on the equator, the longitudinal axes of the dials are parallel to the earth's surface and when the sundial is located at the poles, the longitudinal axis is perpendicular to the earth's surface. In general, the angle of the longitudinal axis of the dials with respect to the earth's surface is equal to the angle of the latitude of placement.

When the sundial of this invention is so oriented, the shadow of the sun at the spring equinox will trace a pattern along the half-circumference, or the length of the dials exactly in the center of the dials. As summer approaches, the shadow will fall to a plane along the lower segment of the half-circumference of the dials as the sun rises higher from the horizon, until the summer solstice occurs on June 21, to a maximum angular displacement from the center circumferential plane of the dials of slightly more than 23 degrees. The sun will then trace consecutive, parallel paths across the concave dial surfaces back toward the center circumferential plane of the dials until the fall equinox, at which time the daily shadow traces will rise on the dials with the sun lowering on the horizon. This continues until the winter solstice, which occurs on December 21, for a maximum deviation of slightly more than 23 degrees from the center circumferential plane of the dials. With appropriate markings located on the dials, whether these markings are characterized by straight lines extending around the circumference of the dials or by more fanciful markings, one can closely estimate the day of the year from the shadow trace of the gnomons, depending upon the scale of the sundial and presuming the ability to detect the difference between the seasons.

A 24-hour day is based on the apparent passage of the sun through 24 angular periods of 15 degrees, each for a total of 360 degrees, or one complete rotation of the earth on its axis. The semi-cylinders, or dials in the sundial of this invention are thus marked with lines in a transverse direction to the circumferential markings for the day of the year, each 15 angular degrees apart for each hour. The shadow cast by the point gnomon on each dial is therefore capable of indicating twelve hours of time and with two dials opposing each other, all 24 hours of the clock can be indicated by the sundial. However, since the entire 24 hours of the clock are usefuly only to an inhabitant of the north or south poles for a short period of time each year, then for practical purposes, the sundial of this invention can be made responsive to the sun for a shorter period of time, for example, between the hours of 2:00 a.m. and 10:00 p.m. However, it will be appreciated that a selected scaling of the dials to cover a desired period of time can be effected, according to the desires of the designer.

Since the sundial of this invention is capable of indicating approximately correct time, regardless of the latitude of placement, throughout a full 24-hour day if desired, an adjustment for correcting the analemma, or the advance or retardation of the sun relative to clock time can be implemented to increase accuracy. With the dials correctly oriented, they may be attached to a rigid or portable framework which is mounted or positioned on an axis that exactly parallels the axis of the earth. This mounting is designed to facilitate rotation of the dials through an angle of approximately four degrees each way, or eight degrees total, to compensate for the approximate plus or minus sixteen clock minutes by which the sun is ahead of or behind the clock.

2. Description of the Prior Art

Various types of sundials are known to those skilled in the art. U.S. Pat. No. 4,355,470, dated Oct. 26, 1982, to Timothy E. Doyle, details an "Equatorial Sundial". The sundial of this invention includes a dial surface and an elongated, rod-like gnomon fixedly secured in operative relationship thereto. The dial surface is generally semi-cylindrical and concave toward the sun and the circumferential portion of the surface is formed in the shape of a partial helix. The gnomon lies on the axis of the dial surface, such that the longitudinal extent of the surface is transverse of the gnomon at an obtuse angle thereto. In a given geographical location, the sundial is so oriented relative to the earth that the gnomon is parallel to the earth's axis of rotation. With a proper pitch of the helical form of the dial surface, the opposite end portions thereof are offset in a direction parallel to the axis of the gnomon, so that neither shade the dial surface, either in the morning or evening. U.S. Pat. No. 4,135,357, dated Jan. 23, 1979, to George Ashton, entitled "Solar Chronometer", details a sundial which is mounted in alignment with the celestial pole and an equatorial member, preferably in the shape of a ring. The solar chronomotor is situated with a style aligned with a celestial pole and an equatorial member aligned with the equator. The style and equatorial member cast shadows upon a chart, such that the point where the shadows intersect indicates the current hour and data. U.S. Pat. No. 4,081,911, entitled "Sundial" was issued on Apr. 4, 1978, to Albert M. Eldridge. The sundial detailed in this patent includes a body portion having a cylindrical wall. A gnomon is connected to the body portion for casting a shadow on the cylindrical wall and a pair of flexible sheets are alternately mountable on the cylindrical wall. Fasteners allow rotation of the sheets about the longitudinal axis of the cylindrical surface to correct for differences between local civil, or clock time and standard time of the time zone of observation. The time lines are configured in accordance with the equation of time and each sheet contains time lines which designate the time occurring in either the fall or spring solstice.. A "Sun Compass" is disclosed in U.S. Pat. No. 4,028,813, dated June 14, 1977, to Alfred M. Eldridge. The sun compass includes a base having a transparent hemisphere, a body movable witihin the base and a plate including a dial face, movable upon the body. Actuating members are connected to the plate and body for selectively moving the plate relative to the body and the body relative to the hemisphere. The actuating members are accessible externally of the hemisphere and include rotatable knobs having scales associated therewith, for indicating the extent of movement of the plate and body. A transparent hemispherical top is mounted over the base hemisphere. U.S. Pat. No. 4,102,054, dated July 25, 1978, entitled "Sundial", to Kemp S. Lewis, discloses a sundial which is adjustable with respect to its mounting location to correct for the earth location in both longitude and latitude. The sundial includes solar time equation indicia and an indicator to correct real solar time to mean solar time and incorporates other indicia to determine the calendar date based on sun declination.

It is an object of this invention to provide a new and improved sundial which is capable of indicating both the time of day and the approximate day of the year.

Another object of the invention is to provide a sundial which is capable of correcting for the advance and retardation of the sun relative to local, or clock time, in order to provide an accurate indication of clock time throughout a 24-hour time span.

Still another object of this invention is to provide a new and improved sundial which is provided with a fixed base and a hingedly-mounted time-indicated portion for accurately indicating the time of day in a time span of up to 24 hours at any latitude of placement and at both equinoxes and solstices.

Yet another object of this invention is to provide a new and improved sundial which can be utilized at any latitude on the earth and is capable of indicating the correct time as closely as one may interpolate the position of the shadow of a point gnomon between the nearest hour or minute marks on a scale.

Yet another object of the invention is to provide a new and improved sundial which is characterized by a fixed base portion, a pair of semicylinders or dials pivotally mounted to an adjustable frame, which frame is hingedly mounted to the base portion, in order to facilitate a pair of curved, time-indicating surfaces which are not distorted by curvature and present an effective surface for reading a shadow cast by spherical point gnomons suspended from the curvature of the dials, respectively.

A still further object of this invention is to provide a new and improved, portable or permanently mounted sundial which is characterized by a base that adjustably mounts a pair of curved, time-indicating dials which are provided with spherical gnomons suspended along a diameter in the center thereof, for sequentially casting a shadow on the dials and accurately indicating the time of day and the approximate day of the year for any time period, including a full 24 hour day.

SUMMARY OF THE INVENTION

These and other objects of the invention are provided in a new and improved sundial which is characterized by a base adapted for selectively fixed or portable attachment to the ground or a stationary object, a support bracket hingedly attached to the base in angle-adjustable relationship; a connecting plate pivotally attached to the support bracket and a pair of semi-cylinders or dials attached to the connecting plate and provided with time markings on the concave inside surfaces thereof and further including spherical gnomons suspended along a diameter of the dials in the center plane thereof, for sequentially casting a shadow on the dials and indicating local, or clock time, responsive to traversal of the shadow of the gnomons longitudinally across the dial surfaces, respectively.

BRIEF DESCRIPTION OF THE DRAWINGS

The invention will be better understood by reference to the accompanying drawings, wherein.

DESCRIPTION OF THE PREFERRED EMBODIMENTS

Figure 1:
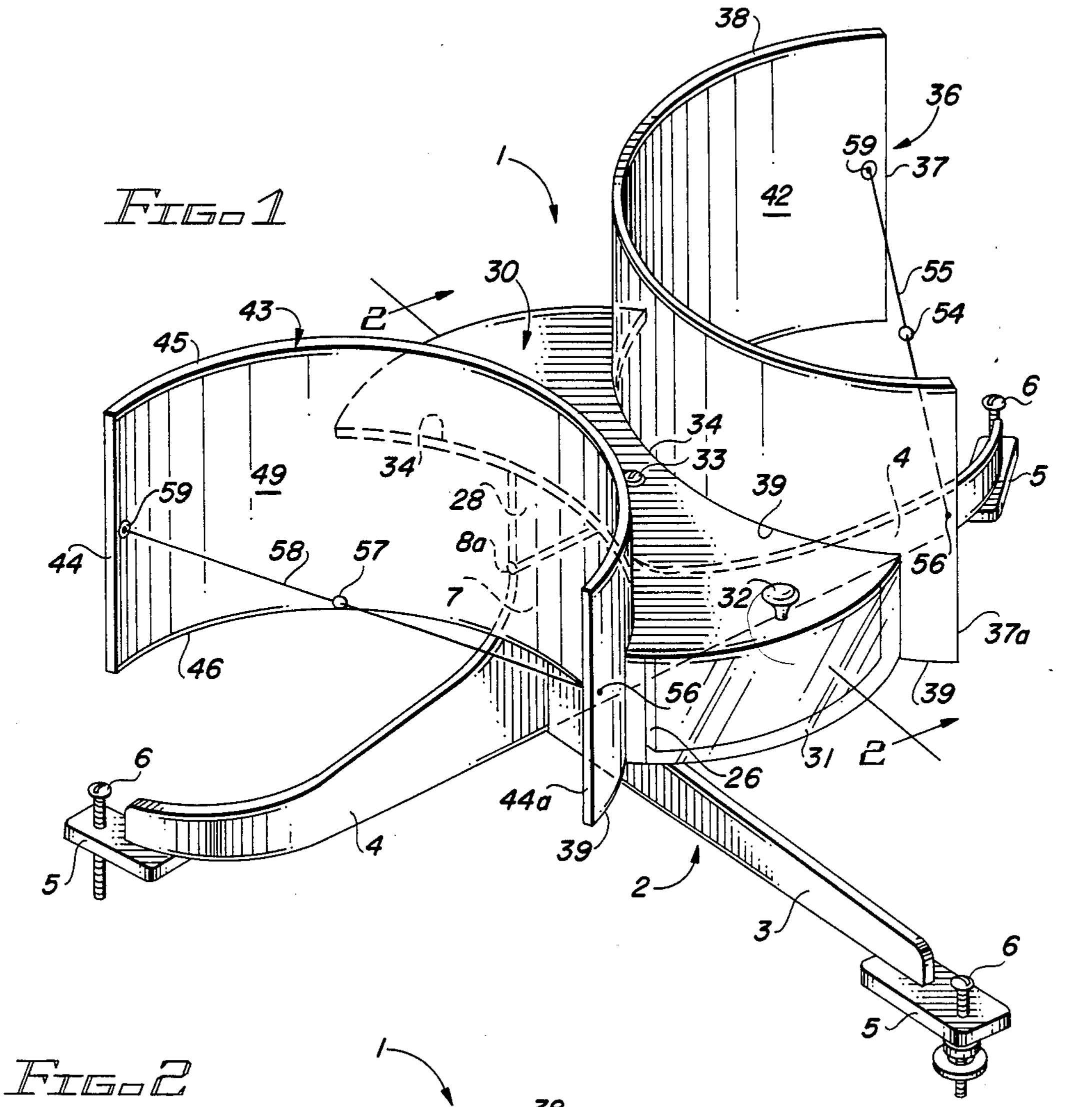
FIG. 1 is a perspective view of a preferred embodiment of the sundial of this invention.
Figure 2:
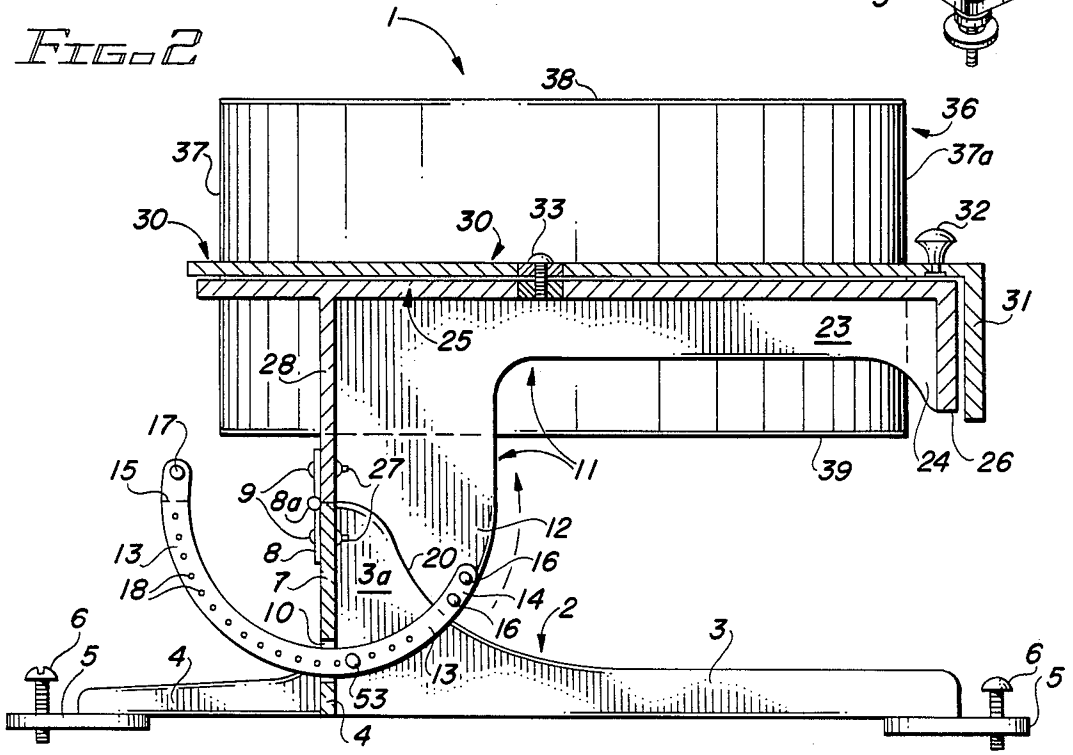
FIG. 2 is a sectional view taken along line 2—2 of the sundial illustrated in FIG. 1.
Figure 1A:
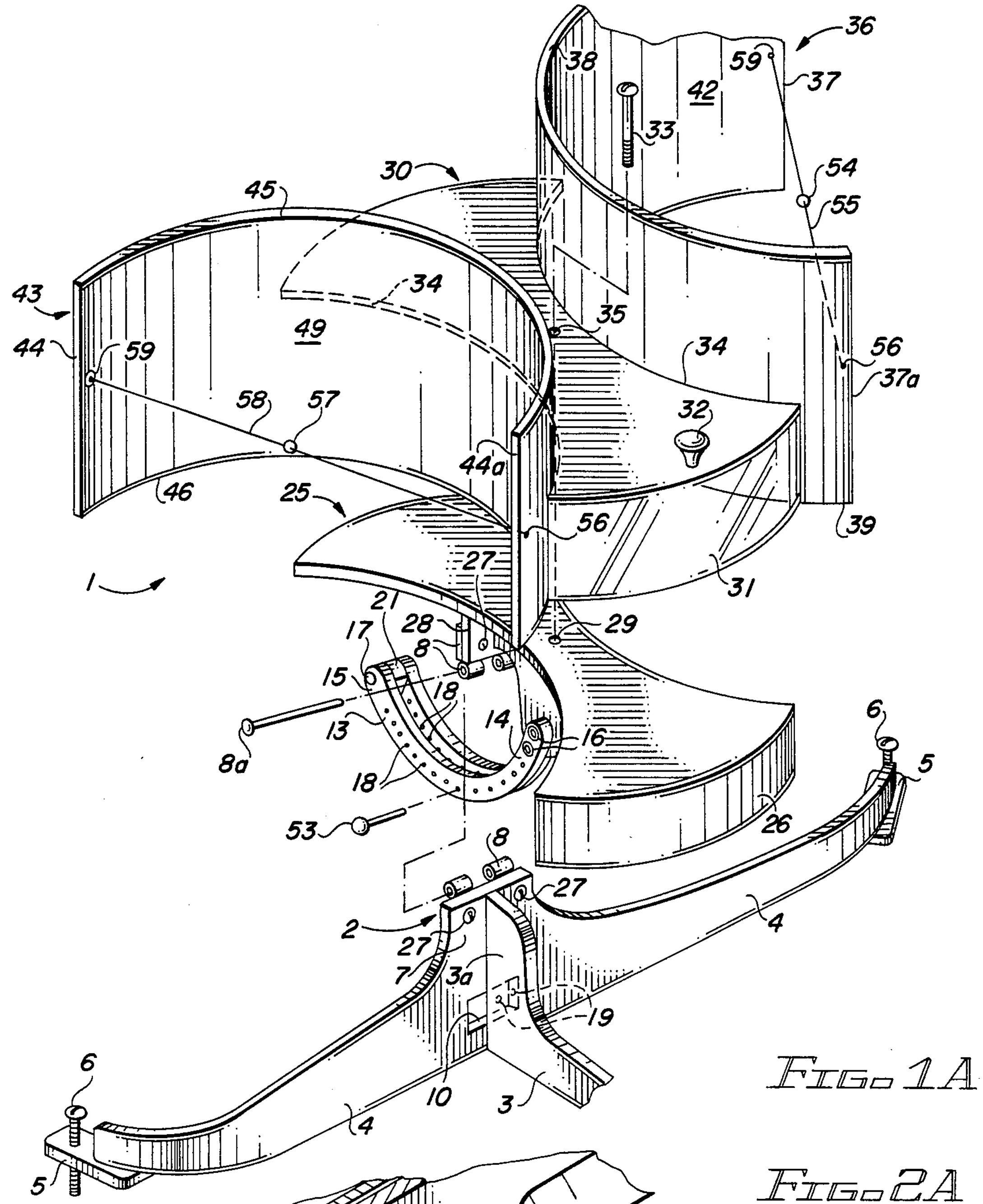
FIG. 1A is an exploded view of the sundial illustrated in FIG. 1.
Figure 2A:
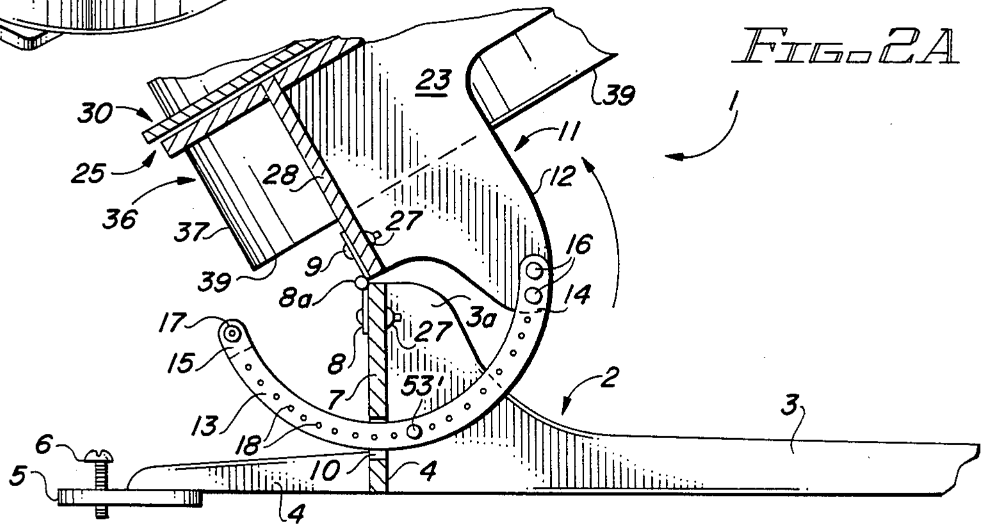
FIG. 2A is a sectional view of the base and support bracket of the sun-dial illustrated in FIGS. 1 and 2.
Figure 3:
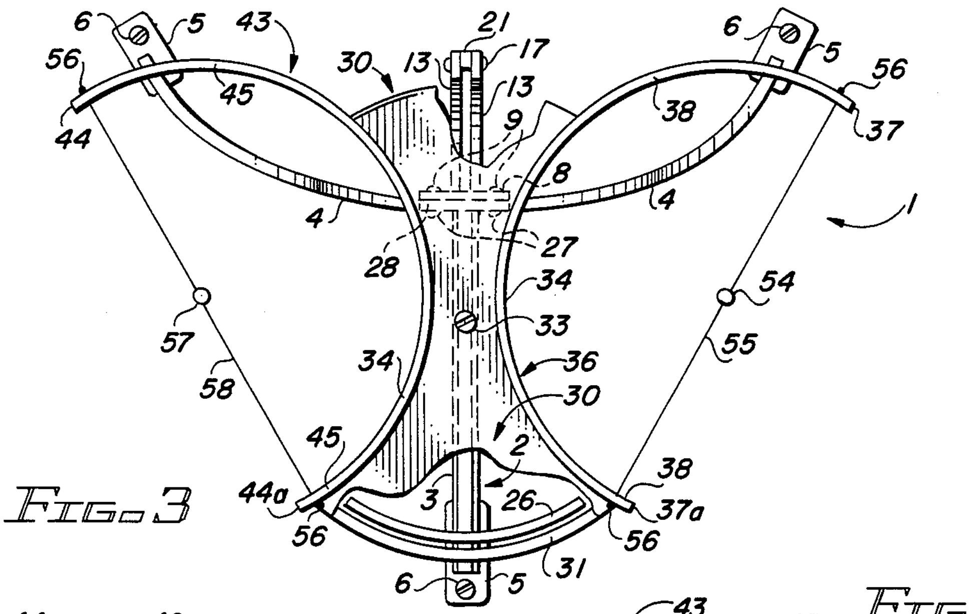
FIG. 3 is a top elevation of the sundial illustrated in FIG. 1.

Referring initially to FIGS. 1, 1A, 2 and 2A of the drawings, the sundial of this invention is generally illustrated in a portable embodiment by reference numeral 1. The sundial 1 is characterized by a base 2, which is characterized by a front base leg 3 and side base legs 4 extending outwardly and rearwardly of the front base leg 3, as illustrated. In a most preferred embodiment of the invention, the front base leg 3 and the side base legs 4 are each fitted with adjusting plates 5, having an adjusting bolt 6 threadibly inserted therein, in order to adjust the plane and attitude of the base 2. A base pedestal 7 defines the upper mid-segment of the side base legs 4 and is coextensive with an upwardly-extending leg flange **3*a*, which projects from the front base leg 3 and is secured to the base pedestal 7 in perpendicular relationship. In a preferred embodiment of the invention, the side base legs 4 and the base pedestal 7 are configured from a common piece of material, while the front base leg 3 and the leg flange 3*a* are shaped from a separate piece of material. The leg flange 3*a* is typically attached to the base pedestal 7 by glue, screws or by other fasteners, according to the knowledge of those skilled in the art. One hinge element of a pedestal hinge 8 is bolted or otherwise secured to the base pedestal 7 by means of hinge bolts 9 and cooperating nuts 27, while the opposite hinge element of the pedestal hinge 8 is bolted to a pedestal plate 28 by means of additional hinge bolts 9 and nuts 27. A hinge pin 8*a* extends through the respective hinge elements of the pedestal hinge 8 to implement hinged connection between the base pedestal 7 and the pedestal plate 28. The pedestal plate 28 rigidly supports a shaped support plate 25 in perpendicular relationship, which support plate 25 extends forwardly of and over the base 2 in substantially parallel relationship with respect to the front base leg 3 when the sundial 1 is oriented in the 0 degree configuration, as hereinafter described. The support plate 25 terminates at one end in a curved, downwardly-extending support plate face 26, as illustrated in FIGS. 1A and 2. The bracket extension 23 of a support bracket 11 is secured to the pedestal plate 28 and the underside of the support plate 25 and is fitted at one end with a downwardly-extending extension tip 24, which contacts and braces the support plate face 26, as further illustrated in FIG. 2. A hinge plate 12 extends the bracket extension 23 downwardly at the opposite end thereof from the extension tip 24 and is configured to match the contour of the leg flange 3*a* along the match line 20, when the support bracket 11 is closed on the base 2 and the base pedestal 7 is vertically aligned with the pedestal plate 28, as illustrated in FIG. 2. The aligned mount ends 14 of a pair of curved adjusting plates 13 are secured to the extending end of the hinge plate 12 by means of mount end bolts 16 and cooperating nuts 27. The adjusting plates 13 project and curve through parallel pedestal slots 10, located in the base pedestal 7 on each side of the leg flange 3*a* and the opposite free ends 15 of the curved adjusting plates 13 are joined by a free end bolt 17 and a nut 27, fitted through a spacer 21. Multiple adjusting holes 18 are provided in spaced relationship in the adjusting plates 13 at five degree intervals and are designed to receive an adjusting plate pin 53, which registers with the adjusting holes 18 and with companion vernier holes 19, provided in spaced relationship at selected intervals, such as four or six degree intervals, in the leg flange 3*a* of the front base leg 3, as illustrated in FIG. 1A. Accordingly, the adjusting plate pin 53 can be inserted in selected registering adjusting holes 18 and vernier holes 19 to tilt the support bracket 11 at a desired angle within a one degree tolerance with respect to the base 2 by operation of the hinge 8**, a hereinafter further described.

Referring now to FIGS. 1, 1A, 2 and 4 of the drawings, a connecting plate 30 is shaped generally in the configuration of the support plate 25 and fits loosely over the support plate 25. The connecting plate 30 is provided with a connecting plate opening 35, which registers with a companion support plate opening 29 located in the underlying support plate 25, as illustrated in FIG. 1A, in order to receive a pivot bolt 33. Accordingly, when the pivot bolt 33 is inserted through the registering connecting plate opening 35 and support plate opening 29 and is secured by a nut (not illustrated), or is tightly threaded into the support plate opening 29, the connecting plate 30 is free to pivot within a selected tolerance with respect to the support plate 25. An adjusting knob 32, illustrated in FIG. 1, extends upwardly from the front area of the support plate 25, in order to accomplish this pivoting function, as hereinafter further described. A connecting plate face 31 extends downwardly from the front edge of the connecting plate 30 and covers the support plate face 26 in slidable, spaced relationship, as illustrated in FIG. 2. A curved east dial 36 is secured to one of the curved connecting plate margins 34 provided in the connecting plate 30, while an oppositely-curved west dial 43 is secured to the oppositely-curved connecting plate margin 34. The east dial 36 and the west dial 43 are each characterized by oppositely- disposed, semi-cylindrical members having concave surfaces facing away from each other and rigidly attached to the connecting plate 30 at the connecting plate margins 34 by glue, screws or other fasteners, as desired. Since the connecting plate 30 is pivotally secured to the rigidly-mounted, underlying support plate 25 by means of the pivot bolt 33, pivoting of the connecting plate 30 with respect to the fixed support plate 25 by grasping the adjusting knob 32 also pivots and angularly displaces the east dial 36 and the west dial 43 in concert with respect to the support plate 25. This pivoting function is facilitated by narrowing the width of the support plate 25 at the support plate opening 29 to a width which is less than that of the connecting plate 30 at the connecting plate opening 35. The east dial 36 and the west dial 43 are further characterized by a smooth, concave east dial face 42 and west dial face 49, respectively, and the east dial 36 is terminated on the front end by an east dial front edge 37*a* and at the opposite rear end by an east dial rear edge 37. Similarly, the west dial 43 is terminated at the front end by a west dial front edge 44*a* and at the opposite end by a west dial rear edge 44. The east dial 36 is further defined by an east dial top edge 38 and a parallel east dial bottom edge 39, while the west dial 43 is characterized by a west dial top edge 45 and a parallel west dial bottom edge 46, respectively. A flexible, elongated east dial gnomon support 55 extends from a first gnomon mount opening 59, located near the midpoint of the east dial rear edge 37, to a second gnomon mount opening 59, positioned near the east dial front edge 37*a* and supports a spherical east dial gnomon 54 in the center thereof. Similarly, a west dial gnomon support 58 projects between a third gnomon mount opening 59, located near the center of the west dial rear edge 44 and a companion gnomon mount opening 59 positioned near the west dial front edge 44*a* and supports a spherical west dial gnomon 57 in the center thereof. In a most preferred embodiment of the invention, the east dial gnomon support 55 is a thread, wire or string which defines a diameter of the east dial 36 and the east dial gnomon 54 is anchored at a center point on the east dial gnomon support 55 which is equidistant between the east dial rear edge 37 and the east dial front edge 37*a*. Accordingly, the east dial gnomon 54 is suspended at the center of a circle defined by completion of the curvature of the east dial 36 and the east dial gnomon support 55 may be supported near the east dial rear edge 37 and east dial front edge 37*a* in the gnomon mount openings 59 by means of support knots 56, knotted in each end of the east dial gnomon support 55. Similarly, the west dial gnomon support 58 defines a diameter of the west dial 43 and is located at the midpoint of the distance between the ends of the west dial rear edge 44 and the west dial front edge 44*a*, with the west dial gnomon 57 located at the center of a circle defined by extension of the west dial 43 curvature. As in the case oof the east dial gnomon support 55, the west dial gnomon support 58 is preferably attached to the west dial 43 near the west dial rear edge 44 and the west dial front edge 44*a* in the gnomon mount openings 59, by means of support knots 56, provided in the ends of the west dial gnomon support 58. Alternatively, suitable stays or anchors (not illustrated) may be secured anywhere on the connecting plate 30 so as to retain the east dial gnomon 54 and west dial gnomon 57 in proper position opposite the centers of the east dial face 42 and west dial face 49, respectively, according to the knowledge of those skilled in the art.

Figure 4:
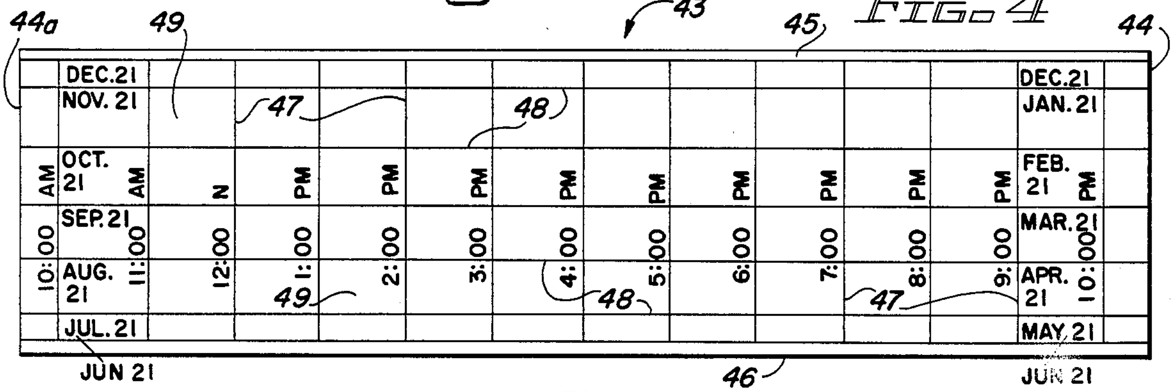
FIG. 4 is a front elevation of the curved face of the west dial of the sundial illustrated in FIG. 1.
Figure 5:
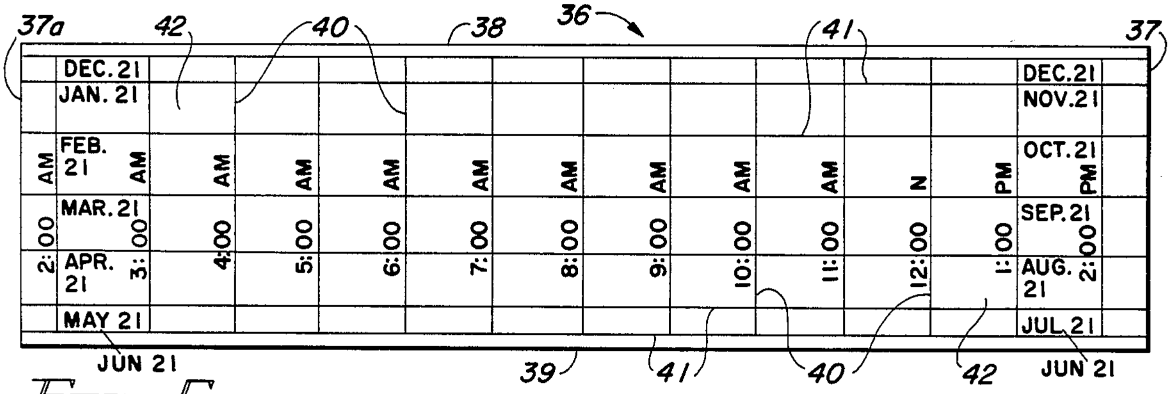
FIG. 5 is a front elevation of the curved face of the east dial of the sundial illustrated in FIG. 1.

Referring now to FIGS. 1, 4 and 5 of the drawings, in a most preferred embodiment of the invention the concave east dial face 42 of the east dial 36 is provided with east dial time marks 40, which are vertically scribed thereon in spaced relationship and east dial month marks 41, which are horizontally scribed in spaced relationship thereon. Similarly, the west dial face 49 of the west dial 43 is provided with vertically oriented, spaced west dial time marks 47 and horizontally spaced west dial month marks 48, as illustrated. The east dial time marks 40 and the west dial time marks 47 are selectively spaced to facilitate indication of the time required for the shadow created by the east dial gnomon 54 and the west dial gnomon 57 and the sun, to move in sequence from the east dial rear edge 37 to the east dial front edge 37*a* and from the west dial front edge 44*a* to the west dial rear edge 44, respectively. The selection of this spacing is arbitrary, depending upon whether a full 24-hour time span indication is desired or whether the time span is to be condensed, for example, to include the time interval of from about 2:00 a.m. to about 10:00 p.m., which is a time span that extends from sunup to sundown in most latitudes other than location of the sundial 1 at the two poles, as further hereinafter described.

Figure 6:
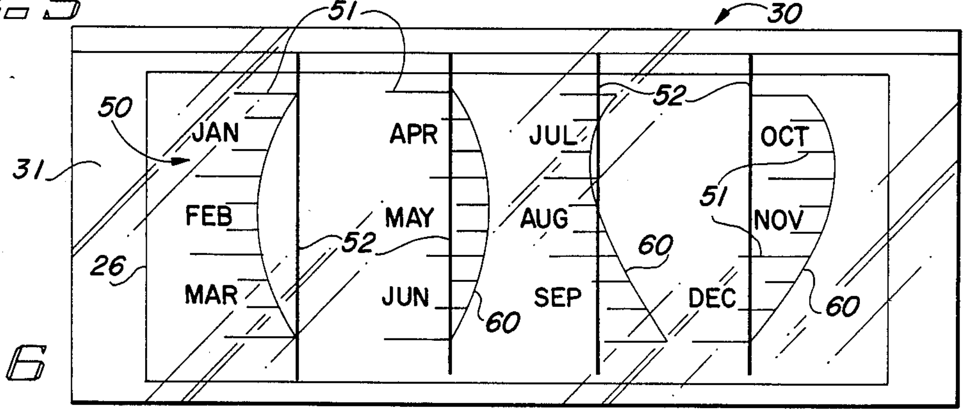
FIG. 6 is a front elevation of the support plate face and overlying connecting plate face of the sun dial illustrated in FIG. 1.

Referring now to FIGS. 1A, 2 and 6 of the drawings, in another preferred embodiment of the invention the support plate face 26 of the support plate 25 is provided with a displacement scale 50, which includes spaced, horizontally oriented lines at intervals indicating approximately 10 days, scribed thereon and identified by month. Each of these month markings 51 are terminated by an analemma curve 60, which is designed to compensate in terms of local, or clock time for the lag or advance of the sun's shadow behind or ahead of clock time due to the elliptical path of the earth around the sun. Vertical, spaced scale lines 52 are provided on the transparent connecting plate face 31 of the connecting plate 30, which connecting plate face 31 overlays the support plate face 26, as illustrated in FIG. 2. Accordingly, the vertically-oriented scale lines 52 are slidably displaced with respect to the displacement scale 50 and the month markings 51, located on the support plate faces 26, when the adjusting knob 32 is grasped and the connecting plate 30 is pivoted with respect to the underlying support plate 25. As heretofore described, this adjustment compensates for the lag or gain of the sun's movement with respect to the clock for the indicated day of the year.

Referring again to the drawings, the sundial 1 of this invention is prepared for use as follows. During a middle hour of the day around noon, the sundial 1 is positioned with the base 2 located on a stable surface and the support plate 25, support bracket 11, connecting plate 30, east dial 36 and west dial 43 are raised in concert toward the sun by operation of the pedestal hinge 8, until a shadow generated by the east dial gnomon 54 indicates the approximate current day of the year relative to the east dial month marks 41, located on the curved east dial face 42. The sundial 1 is then adjusted using the adjusting bolts 6, until the shadows cast on the east dial face 42 and the west dial face 49 by the east dial gnomon 54 and the west dial gnomon 57, respectively, indicate the same day, and maintain this indication as the sundial 1 is rotated on its vertical axis about the pivot bolt 33. The connecting plate 30 is then rotated relative to the support plate 25 to align the appropriate scale line 52, located on the connecting plate face 31, with the current month and approximate day markng 51, noted on the support plate face 26, and compensate for that day's advance or retardation of the sun relative to clock time. The sundial 1 is then again rotated on its axis about the pivot bolt 33 until the correct time of day is indicated by the shadow generated by the east dial gnomon 54 and the west dial gnomon 57, at or near the midday period. The adjusting bolts 6 are again threadibly manipulated in the respective adjusting plates 5, until the correct day is indcated on both the east dial face 42 of the east dial 36 and the west dial face 49 of the west dial 43, and the time of day is confirmed once again with regard to the east dial time marks 40 and the west dial time marks 47, respectively. The sundial 1 is then clamped or the base 2 otherwise firmly secured in place to prevent any further movement of the base 2.

It will be appreciated by those skilled in the art that the sundial of this invention is capable of indicating accurate clock time regardless of the latitude at which it is placed. However, it is understood that the east dial time marks 40 and east dial month marks 41, located on the east dial face 42 and the west dial time marks 47, along with the west dial month marks 48, located on the west dial face 49, must be relocated if the sundial 1 is to be used in any location south of the equator. This change is not necessary if the connecting plate 30 and the complimentary support plate 25 are mounted to position the east dial 36 and the west dial 43 in a 180 degree orientation with respect to the base 2, in order to facilitate angular adjustment of the east dial 36 and the west dial 43 at an angle from 0 degrees at the equator, to 90 degrees at either one of the poles.

It will be further appreciated by those skilled in the art that the sundial of this invention is capable fo being altered such that it will read and indicate daylight savings time as a function of local clock time. Such an alteration includes modifying the support plate 25 to accommodate an additional rotation of the connecting plate 30 with respect to the support plate 25 such that a relative rotation of about 15 degrees is facilitated, to accomplish the daylight savings time change. This rotational adjustment can be set or clamped into position, with the connecting plate 30 remaining rotatable with respect to the support plate 25, in order to compensate for the lag or advance of the sun relative to the earth, as heretofore described.

It will also be appreciated by those skilled in the art that the sundial of this invention can be constructed of a variety of materials, including metal, thermoplastic and thermoresin material of selected density and character and fiberglass, as well as other materials well known to those skilled in the art. Furthermore, while the sundial 1 illustrated in the drawngs is portable and adjustable as to latitude by operation of the adjusting bolts 6, the pedestal hinge 8 and the adjusting plates 13, it will be recognized that the sundial 1 can also be permanently mounted on a fixed pedestal, mount or base at a predetermined angle which is proper for a selected latitude and in an accurate East-West position. Such a mounting would eliminate the need for a pedestal hinge 8, adjusting plates 13 and adjusting bolts 6, as well as the front base leg 3 and side base legs 4.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A sundial comprising base means adapted for mounting on a supporting surface; support bracket means carried by said base means in angularly adjustable relationship; a pair of curved dial means carried by said support bracket means, said dial means each having a concave surface facing in oppositely-disposed, fixed relationship with respect to each other for sequentially facing the sun; spaced time marks provided on said concave surface for marking the passage of time; at least one arcuate adjusting plate carried by said support bracket means, a plurality of plate openings provided in said arcuate adjusting plate and pin means adapted for insertion in said plate openings and for engagement with said base means, said arcuate adjusting plate adapted for engaging said base means in adjustable relationship and vertically adjusting said support bracket means and said dial means in a selected angular relationship with respect to the supporting surface; and a pair of gnomons suspended across a diameter of said dial means, respectively, whereby the shadow cast by said gnomons sequentially traverses said concave surface and said time marks substantially in accordance with clock time, responsive to rotation of the earth.

2. The sundial of claim 1 further comprising pivot means provided in said support bracket means and said dial means for pivoting said dial means in concert with respect to said support bracket means; first analemma adjustment indicia provided on said support bracket means; and second analemma adjustment indicia provided on said dial means, whereby said second analemma adjustment indicia is selectively aligned with said first analemma adjustment indicia responsive to pivoting of said dial means with respect to said support bracket means.

3. The sundial of claim 1 wherein said base means further comprises a front leg projecting substantially beneath said support bracket means; a pair of side legs fixedly attached to said front leg for portably supporting said support bracket means and said dial means on the supporting surface; a first hinge element carried by said front leg; and a second hinge element carried by said support bracket means, said first hinge element engaging said second hinge element in hinged relationship, whereby said support bracket means and said dial means are vertically adjustable in concert to a selected angle with respect to said front leg.

4. The sundial of claim 5 further comprising adjusting means provided in said front leg and said side legs for adjusting the attitude of said support bracket means and said dial means.

5. The sundial of claim 5 further comprising:

(a) pivot means provided in said support bracket means and said dial means for pivoting said dial means in concert with respect to said support bracket means;

(b) first analemma adjustment indicia provided on said support bracket means and second analemma adjustment indicia provided on said dial means, whereby said second analemma adjustment indicia is selectively aligned with said first analemma adjustment indicia responsive to pivoting of said dial means with respect to said support bracket means; and (c) a slot provided in said side legs and wherein said arcuate adjusting plate extends through said slot for vertically adjusting said support bracket means and said dial means in a selected angular relationship with respect to the supporting surface responsive to insertion of said pin means in a selected one of said plate openings.

6. The sundial of claim 5 further comprising adjusting means provided in said front leg and said side legs for adjusting the attitude of said support bracket means and said dial means.

7. The sundial of claim 1 wherein:

(a) said support bracket means further comprises a support bracket extending to said base means; a first hinge element carried by said base means and a second hinge element carried by said support bracket, said first hinge element engaging said second hinge element in hinged relationship; a support plate fixedly carried by said support bracket; and a connecting plate pivotally carried by said support plate; and (b) said dial means further comprises a pair of arcuate dials fixedly attached to said connecting plate, whereby said connecting plate and said dials are pivotally adjustable in concert with respect to said support plate.

8. The sundial of claim 7 further comprising first analemma adjustment indicia provided on said support plate and second analemma adjustment indicia provided on said connecting plate, whereby said second analemma adjustment indicia is selectively aligned with said first analemma adjustment indicia responsive to pivoting of said connecting plate with respect to said support plate.

9. The sundial of claim 7 wherein said base means further comprises a front leg projecting substantially beneath said support bracket, said front leg receiving said first hinge element and a pair of side legs fixedly attached to said front leg for portably supporting said support bracket, said connecting plate and said dials on the supporting surface.

10. The sundial of claim 7 wherein said base means further comprises a front leg projecting substantially beneath said support bracket, said front leg receiving said first hinge element and a pair of side legs fixedly attached to said front leg for portably supporting said support bracket, said connecting plate and said dials on the supporting surface; and further comprising analemma adjustment indicia provided on said support plate and second analemma adjustment indicia provided on said connecting plate, whereby said second analemma adjustment indicia is selectively aligned with said first analemma adjustment indicia responsive to pivoting of said connecting plate with respect to said support plate.

11. The sundial of claim 10 further comprising a slot provided in said side legs and wherein said arcuate adjusting plate extends through said slot for vertically adjusting said support bracket means and said dial means in a selected angular relationship with respect to the supporting surface responsive to insertion of said pin means in a selected one of said plate openings.

12. The sundial of claim 11 further comprising adjusting means provided in said front leg and said side legs for adjusting the attitude of said support bracket, said connecting plate and said dials.

13. The sundial of claim 12 wherein said at least one arcuate adjusting plate further comprises a pair of spaced, arcuate adjusting plates having one end attached to said support bracket and wherein said plurality of plate openings are provided in a first spacing interval in said adjusting plates; and further comprising a plurality of bracket openings provided in a second spacing interval in said front leg; and wherein said adjusting pin is adapted to selectively register with aligned ones of said plate openings and said bracket openings for angular adjustment of said dials with respect to the supporting surface.

14. The sundial of claim 1 further comprising a plurality of shadow traverse lines provided on said concave surface in longitudinal, spaced relationship, said shadow traverse lines intersecting said time marks for indicating the month of the year.

15. The sundial of claim 14 further comprising:

(a) pivot means provided in said support bracket means and said dial means for pivoting said dial means in concert with respect to said support bracket means; first analemma adjustment indicia provided on said support bracket means; and second analemma adjustment indicia provided on said dial means, whereby said second analemma adjustment indicia is selectively aligned with said first analemma adjustment indicia responsive to pivoting of said dial means with respect to said support bracket means; and (b) a slot provided in said side legs and wherein said arcuate adjusting plate extends through said slot for vertically adjusting said support bracket means and said dial means in a selected angular relationship with respect to the supporting surface responsive to insertion of said pin means in a selected one of said plate openings.

16. The sundial of claim 15 wherein:

(a) said support bracket means further comprises a support bracket extending to said base means; a first hinge element carried by said base means and a second hinge element carried by said support bracket, said first hinge element engaging said second hinge element in hinged relationship; a support plate fixedly carried by said support bracket; and a connecting plate pivotally carried by said support plate; and (b) said dial means further comprises a pair of arcuate dials fixedly attached to said connecting plate, whereby said connecting plate and said dials are pivotally adjustable in concert with respect to said support plate.

17. The sundial of claim 18 wherein said base means further comprises a front leg projecting substantially beneath said support bracket, said front leg receiving said first hinge element, and a pair of side legs fixedly attached to said front leg for portably supporting said support bracket, said support plate, said connecting plate and said dials on the supporting surface.

18. A sundial which substantially indicates clock time, comprising base means adapted for mounting on a supporting surface; support bracket means hingedly carried by said base means and plate adjusting means attached to said support bracket means, said plate adjusting means adapted for engaging said base means in adjustable relationship and adjusting the angle between said support bracket means and the supporting surface; a support plate fixedly carried by said support bracket means; a connecting plate lying adjacent said support plate in stacked relationship and pivot means connecting said support plate and said connecting plate in pivoting relationship; a first semi-cylindrical dial fixedly attached to said connecting plate, with a first concave surface of said first semi-cylindrical dial facing outwardly of said connecting plate; a second semi-cylindrical dial fixedly attached to said connecting plate in spaced relationship with respect to said first semi-cylindrical dial, with a second concave surface of said second semi-cylindrical dial facing outwardly of said connecting plate in oppositely-disposed relationship with respect to said first concave surface; a first set of spaced time marks provided and identified in sequence on said first concave surface and a second set of spaced time marks provided and identified in sequence on said second concave surface for indicating the passage of time; a first gnomon suspended across a diameter of said first semi-cylindrical dial and a second gnomon suspended across a diameter of said second semi-cylindrical dial, respectively, whereby the shadow cast by said first gnomon and said second gnomon sequentially traverses said first set of spaced time marks and said second set of spaced time marks, respectively, substantially in accordance with clock time responsive to rotation of the earth on its axis.

19. The sundial of claim 18 further comprising first analemma adjustment indicia provided on said support plate and second analemma adjustment indicia provided on said connecting plate, whereby said second analemma adjustment indicia is selectively aligned with said first analemma adjustment indicia responsive to pivoting of said connecting plate with respect to said support plate.

20. The sundial of claim 19 wherein said plate adjusting means further comprises at least one arcuate adjusting plate carried by said support bracket means, said arcuate adjusting plate adapted for engaging said base means in adjustable relationship and vertically adjusting said support bracket means, said support plate, said first semi-cylindrical dial and said second semi-cylindrical dial in a selected angular relationship with respect to the supporting surface.

21. The sundial of claim 20 wherein said at least one arcuate adjusting plate is a pair of arcuate adjusting plates having one end attached to said support bracket means and further comprising a plurality of plate openings provided in a first spacing interval in said adjusting plates; a plurality of bracket openings provided in a second spacing interval in said base means; and an adjusting pin adapted to selectively register with aligned ones of said plate openings and said bracket openings, for angular adjustment of said dials with respect to the supporting surface.

22. The sundial of claim 21 wherein said support bracket means further comprises a support bracket extending to said base means; a first hinge element carried by said base means; and a second hinge element carried by said support bracket, said first hinge element engaging said second hinge element in hinged relationship, for effecting said angular adjustment.

23. The sundial of claim 22 wherein said base means further comprises a front leg projecting substantially beneath said support plate, said front leg receiving said first hinge element and a pair of side legs fixedly attached to said front leg for portably supporting said support bracket, said support plate, said connecting plate and said dials on the supporting surface.

24. The sundial of claim 23 further comprising adjusting means provided in said front leg and said side legs for adjusting the attitude of said support bracket, said support plate, said connecting plate and said dials.

25. A sundial comprising base means adapted for mounting on a supporting surface; support bracket means carried by said base means in a selected angular relationship, said angular relationship substantially corresponding to the latitudinal location of said sundial; a pair of curved dial means carried by said support bracket means, said dial means each having a concave surface facing in oppositely-disposed, fixed relationship with respect to each other for sequentially facing the sun; spaced time marks provided on said concave surface for marking the passage of time; and a pair of gnomons suspended across a diameter of said dial means, respectively, whereby the shadow cast by said gnomons sequentially traverses said concave surface and said time marks substantially in accordance with clock time, responsive to rotation of the earth.

26. The sundial of claim 26 further comprising pivot means provided in said support bracket means and said dial means for pivoting said dial means in concert with respect to said support bracket means; first analemma adjustment indicia provided on said support bracket means; and second analemma adjustment indicia provided on said dial means, whereby said second analemma adjustment indicia is selectively aligned with said first analemma adjustment indicia responsive to pivoting of said dial means with respect to said support bracket means.

27. The sundial of claim 25 wherein the supporting surface is the earth and said base means fixedly engages said support bracket means and the earth.

28. The sundial of claim 25 further comprising pivot means provided in said support bracket means and said dial means for pivoting said dial means in concert with respect to said support bracket means; first analemma adjustment indicia provided on said support bracket means; and second analemma adjustment indicia provided on said dial means, whereby said second analemma adjustment indicia is selectively aligned with said first analemma adjustment indicia responsive to pivoting of said dial means with respect to said support bracket means and wherein the supporting surface is the earth and said base means fixedly engages said support bracket means and the earth

* * * * *